United States Patent [19]

Kuribayashi et al.

[11] 4,404,671
[45] Sep. 13, 1983

[54] LINEAR DRIVE MOTOR CONTROL SYSTEM

[75] Inventors: Hiroshi Kuribayashi; Atsuo Ikeda, both of Tokorozawa, Japan

[73] Assignee: Pioneer Electronic Corporation

[21] Appl. No.: 210,185

[22] Filed: Nov. 25, 1980

Related U.S. Application Data

[63] Continuation of Ser. No. 30,981, Apr. 18, 1979, abandoned.

[30] Foreign Application Priority Data

Apr. 20, 1978 [JP] Japan ................................. 53-46798

[51] Int. Cl.³ ............................................. G11B 17/02
[52] U.S. Cl. ................................. 369/216; 318/687; 369/219; 369/226; 369/243
[58] Field of Search ............... 318/687, 135, 640; 369/216, 219, 220, 226, 231, 232, 233, 243, 249

[56] References Cited

U.S. PATENT DOCUMENTS

| | | | |
|---|---|---|---|
| 4,118,039 | 10/1978 | Kurata et al. | 369/220 |
| 4,124,216 | 11/1978 | Sorensen | 369/220 |
| 4,135,086 | 1/1979 | Baba | 369/41 |
| 4,171,817 | 10/1979 | Iyeta | 369/220 |
| 4,185,836 | 1/1980 | Taylor et al. | 369/220 |
| 4,253,126 | 2/1981 | Kuribayashi et al. | 369/219 |

Primary Examiner—Steven L. Stephan
Attorney, Agent, or Firm—Sughrue, Mion, Zinn, Macpeak and Seas

[57] ABSTRACT

A drive control system for a linear motor having a stator and a sliding member capable of sliding along the stator. A position detector comprises an arrangement of light emitting elements and a detector, or the converse to produce a position signal. A comparator compares the position signal with a reference signal to produce an output drive signal for the linear motor.

6 Claims, 6 Drawing Figures

LINEAR DRIVE MOTOR CONTROL SYSTEM

This is a Continuation of application Ser. No. 30,981, filed Apr. 18, 1979, now abandoned.

BACKGROUND OF THE INVENTION

This invention relates to a linear motor drive control device, and more particularly to a linear motor drive control device of a linear tracking type tonearm assembly in an audio record player.

A linear tracking type tonearm assembly in an audio record player generally comprises a linear tracking type tonearm and a linear motor section for driving the tonearm. The linear motor section comprises an electromagnet having a horizontally arranged magnetic member and a coil spirally wound therearound. A permanent magnet faces the electromagnet with a predetermined distance to supply a magnetic flux to the coil, and a sliding member with the permanent magnet mounted thereon is capable of slidingly moving along a guide member arranged in parallel with the magnetic member. Hence, the sliding member is slidingly moved in parallel with the magnetic member by applying an electric current to the coil to thereby energize the electromagnet. The linear tracking type tonearm is supported by an arm holder mounted on the sliding member, so that it is allowed to move in a vertical direction.

With the above described linear tracking type tonearm assembly, by controlling an electric current flowing in the coil of the electromagnet, control of the movement direction and the movement speed of the tonearm is attained.

In this case, however, it is extremely difficult to horizontally slide the tonearm toward a desired position, i.e., the initial record groove of a recorded music disk to be reproduced, an arm rest or the like, and then to stop it above the desired position accurately in order to descend the tonearm to the desired position.

SUMMARY OF THE INVENTION

Accordingly, an object of this invention is to eliminate the above described difficulties accompanying the conventional linear tracking type tonearm assembly.

Another object of this invention is to provide a linear tracking type tonearm assembly having a linear motor driving control device which operates to control the reproducing operation of a tonearm accurately.

These and other objects of this invention are accomplished by the provision of an improved linear motor driving control device for use in an audio record player. In the linear motor driving control device, a plurality of light emitting elements are embedded in a stationary portion of a linear motor at positions eac corresponding to that of arm rest, the initial record groove of a record disk (17 cm, 25 cm or 30 cm) or the non-recorded end portion of the record disk. The light emitted from the light emitting elements is received by a light receiving element mounted on the sliding member of the linear motor. The movement direction and the movement speed of the tonearm are controlled according to the quantity of light thus received by the light receiving element and the size of record disk to be reproduced is designated by turning on the corresponding light emitting element.

This invention will be described in detail hereinafter with reference to its preferred embodiment shown in the accompanying drawings.

DETAILED DESCRIPTION OF THE PREFERRED EMBODIMENTS

Figure 1:
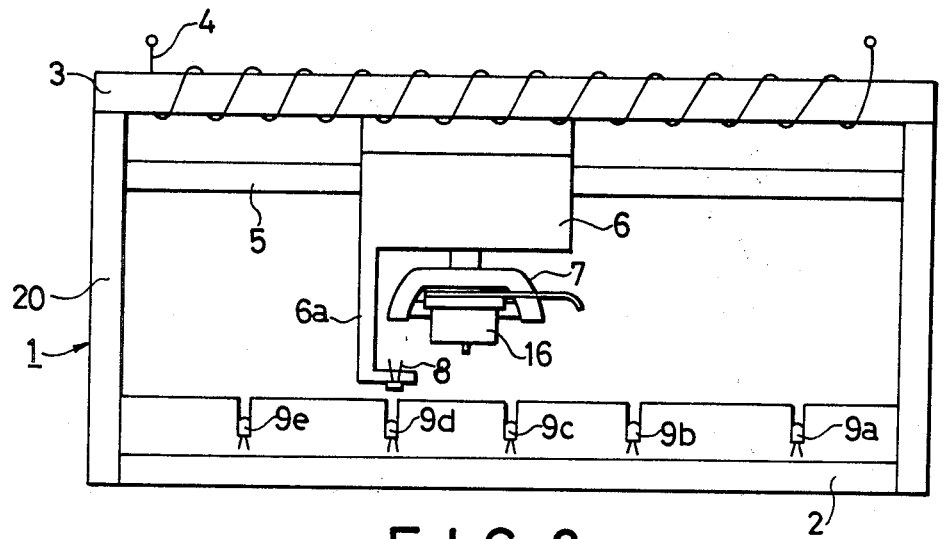
FIG. 1 is a side view illustrating one preferred embodiment of a linear tracking type tonearm assembly according to this invention.
Figure 2:
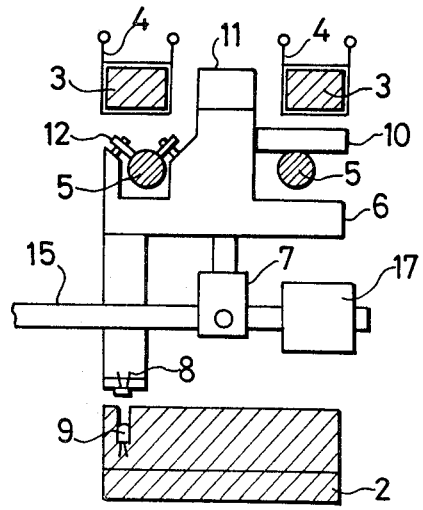
FIG. 2 is a cross-sectional view of the linear tracking type tonearm assembly taken along a line II—II shown in FIG. 1.

FIG. 1 is a side view illustrating one preferred embodiment of a linear tracking type tonearm assembly in an audio record player according to this invention, and FIG. 2 is a cross-sectional view taken along a line II—II shown in FIG. 1. Reference numeral 1 designates a supporting stand having a base plate 2 and side walls 20. A pair of electromagnets each having a magnetic member 3 and a coil 4 spirally wound therearound is horizontally supported by the side walls 20, and a pair of guide rails 5 are also horizontally supported by the side walls 20. Accurate alignment of the electromagnets and the guide rails 5 is achieved by mounting both ends to the side walls 20 and maintaining parallel arrangements with respect to each other. A sliding member or carriage 6 is provided with a guide capstan 10 and a pair of guide rollers 12 (shown in FIG. 2) which are contact with the guide rails 5 to maintain the sliding member 6 horizontally. In an alternative embodiment, the linear motor can be implemented as a moving coil linear motor in which coil 4 is attached to the sliding member 6.

The sliding member 6, has on the top portion a permanent magnet 11 mounted, is arranged to pass through the gap defined by the pair of electromagnets with predetermined distances from the electromagnets. Hence, upon the energization of the electromagnet by supplying an electric current to the coil 4, the sliding member 6 slidingly moves along the guide rails 5 in a stable manner. The moving direction is defined by the following direction of electric current in the coil 4 and the moving speed is varied according to the intensity of electric current therein. In this case, the magnetic members 3 and the coils 4 serve as a stator and the sliding member 6 and the permanent magnet 11 serves as a movable element.

A tonearm 15, which is supported by an arm holder 7 to mainly move in a vertical direction, constitutes the linear tracking type tonearm assembly together with the above described linear motor section. The tonearm 15 is provided with a cartridge 16 at one end thereof and is provided with a balance counter weight 17 at the other end thereof.

A position detecting device for detecting the position of sliding member 6 or the tonearm 15 will be described hereinafter. An L-shaped supporting arm 6a (FIG. 1) is integrally formed with the sliding member 6. A CdS photocell 8 is provided at the end portion of the L-shaped arm 6a as a light receiving element, so that it can receive the light emitted by a light emitting diode 9 (LED). Conversely, a plurality of LEDs 9a to 9e are embedded in the base plate 2 of the supporting stand 1 as a light emitting element. As best shown in FIG. 1, the LEDs 9a to 9e are arranged below the guide rails 5 from the position corresponding to an arm rest to that corresponding to the center of a record disk in that order. Specifically, the LED 9a is arranged to directly face the CdS 8 when the tonearm is at rest on the arm rest (not shown). Similarly, the LED 9b is arranged at a position corresponding to an initial record groove of record disk (approximately 30 cm) and the LEDs 9c and 9d are also arranged at those corresponding to initial record grooves of 25 cm and 17 cm, respectively. Furthermore, the LED 9e is arranged at a position corresponding to the non-recorded end portion of record disk. Otherwise, LED may be substituted for the photocell 8 as shown in FIG. 1 and a plurality of photocells substituted for the LEDs 9a-e and yet obtain the same effect.

In this linear tracking type tonearm assembly, assuming, for example that the LED 9b is turned on, at the beginning of the sliding movement of the sliding member 15 toward the initial record groove of 30 cm record disk from the arm rest, no light emitted by the LED 9b can reach the CdS 8. As the sliding member 6 approaches the LED 9b, the quantity of light received by the CdS 8 gradually increases. When the CdS 8 directly faces the LED 9b, the quantity of light received by the CdS 8 reaches a maximum value. Thereafter, as the sliding member 6 further slidingly moves toward the center of the record disk, the quantity of light received by the CdS 8 gradually decreases and finally becomes zero. If the other LEDs 9c to 9e are turned on, the same sequence in the variation of light quantity results.

Figure 3:
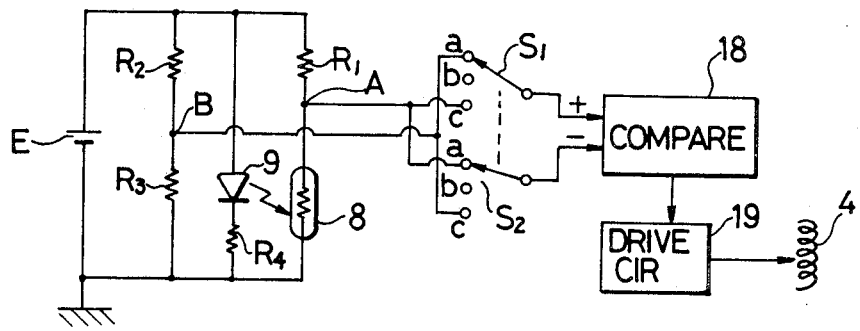
FIG. 3 is a schematic circuit diagram showing an equivalent circuit of one preferred embodiment of a linear motor driving control device in the linear tracking type tonearm assembly.

FIG. 3 shows an equivalent circuit of one preferred embodiment of a linear motor driving control device according to this invention where one end of the CdS 8 is connected through a resistor $R_1$ to a constant voltage source E, and the other end thereof is grounded. A series circuit of resistors $R_2$ and $R_3$ is connected between the constant voltage source E and ground. Accordingly, the resistors $R_1$ to $R_3$ and the CdS 8 constitute a bridge circuit. A comparator 18 which operates to compare a voltage appearing at a junction A between the resistor $R_1$ and the CdS 8 with a voltage appearing at a junction B between the resistors $R_2$ and $R_3$ is provided. The voltage at the junction B is constant because the resistors $R_2$ and $R_3$ are fixed resistors. Therefore, the voltage at the junction B is employed as a reference voltage. The output voltages are applied through ganged switches $S_1$ and $S_2$ to the comparator 18. The series circuit of the LED 9 and a biasing resistor $R_4$ is connected between the constant voltage source E and ground.

The comparator 18 operates to generate an output proportional to the difference between the two input voltages and has a specific polarity to thereby control the intensity and flowing direction of electric current in the coil 4 through the drive circuit 19.

Figure 4:
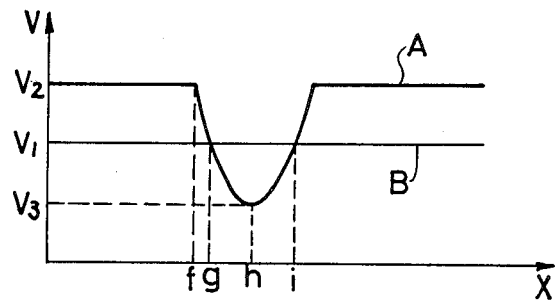
FIG. 4 is a graphical representation representative of the relationship between a reference voltage and the output voltage of a light receiving element in the equivalent circuit shown in FIG. 3.

FIG. 4 is a graphical representation showing the relationship between the voltages of the junctions A and B in the bridge circuit shown in FIG. 3 and the position of the sliding member 6. Operation of the circuit shown in FIG. 3 for reproducing a music recorded on a record disk of 30 cm will be described with reference to FIGS. 3 and 4.

The tonearm 15 is initially at rest on the arm rest. Upon the start of reproduction of recorded music, only the LED 9b is energized to designate a size of record disk to be now reproduced and the ganged switches $S_1$ and $S_2$ are shifted from neutral terminals b to stationary terminals a, respectively. As a result, the reference voltage $V_1$ defined by the resistors $R_2$ and $R_3$ is applied through the switch $S_1$ to the non-inverted terminal of the comparator 18. On the contrary, as described above, because no light emitted by the LED 9b can reach the CdS 8 initially, the resistance value of the CdS 8 shows maximum and therefore the voltage appearing at the junction A becomes maximum. It should be noted that the resistance value of the CdS 8 is determined so that the maximum voltage $V_2$ is larger than the reference voltage $V_1$ and the reference voltage $V_1$ is determined and set be an average of the maximum voltage and a minimum voltage appearing at the junction A.

The minimum voltage level is detected when the CdS 8 directly faces the LED 9b. The voltage $V_2$ is applied through the switch $S_2$ to the inverted terminal of the comparator 18. Accordingly, the comparator 18 operates to output a positive level signal proportional to an absolute value of $(V_2-V_1)$ to a drive circuit 19. Then, the driving circuit 19 operates to control a driving current supplied to the coil 4 according to the positive level signal in order to slidingly move the sliding member 6 toward the center of record disk, that is, in the forward direction. Hence, the tonearm 15 moves toward the initial record groove.

When the sliding member 6 reaches a position f shown in FIG. 4, incident light emitted from the LED 9b is detected by the CdS 8. Thereafter, as the movement of sliding member 6 in the forward direction continues, the resistance value of the CdS 8 gradually decreases. Therefore, the voltage appearing at the junction A also gradually decreases from the maximum value $V_2$ as shown in FIG. 4. Accordingly, the driving current also decreases. Subsequently, when the sliding member 6 reaches a position g, the voltage $V_2$ at the junction A becomes equal to the reference voltage $V_1$ to thereby stop the linear motor. The position g is determined so that, when the sliding member 6 reaches the position g, a stylus mounted on the cartridge 16 is positioned above the initial record groove of record disk of 30 cm. Hence, the absolute value of $(V_2-V_1)$ represents the displacement of the sliding member from above position g.

Assuming that the linear motor over-shoots and the sliding member 6 passes the position g in the forward direction (provided that the sliding member does not pass the position i in the forward direction), since the voltage at the junction B is larger than that at the junction A, the comparator 18 operates to output a negative level signal proportional to the absolute value of $(V_2-V_1)$. Therefore, the direction of electric current flowing in the coil 4 is reversed to thereby sliding move the sliding member 6 toward the position g, that is, in the reverse direction. Finally, the tonearm 15 is positioned above the initial record groove of 30 cm record disk to start the reproduction thereof.

Figure 5:
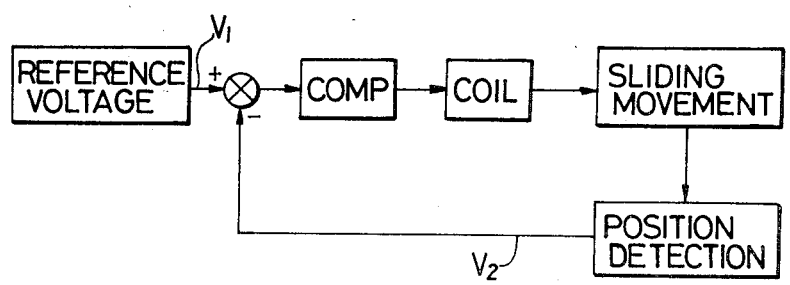
FIG. 5 is a block diagram showing the operation steps of this invention.
Figure 6:
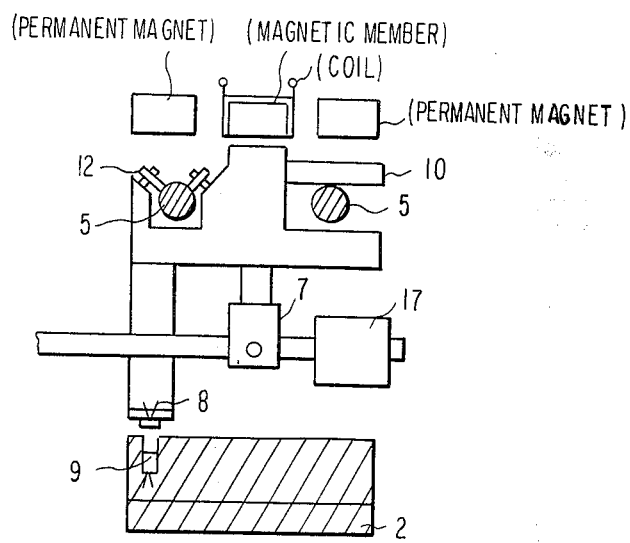
FIG. 6 is a view similar to FIG. 2 but illustrating an embodiment employing a moving coil type linear motor.

This operation sequence is shown in FIG. 5. By comparing the output voltage $V_2$ of the CdS 8 in a position detection section with the reference voltage $V_1$ at the point B, the driving current is supplied to the coils 4 of the electromagnet according to the difference between the voltages $V_1$ and $V_2$, whereby the movement of the sliding member 6 is controlled. Subsequently, position detection is carried out by the position detection section and then the output voltage $V_2$ of the CdS 8 is again compared with the reference voltage $V_1$. As a result, this operation sequence constitutes a closed roop as a feed-back operation. Hence, accurate position detection and tonearm drive control are possible.

As shown in FIG. 4, the reference voltage $V_1$ is determined as the average of the maximum value $V_2$ and the minimum value $V_3$ of the output voltage of the CdS 8. An output voltage characteristic curve which represents a variation of the output voltage $V_2$ of the CdS 8, shows high linearity in the vicinity of the reference voltage $V_1$. Hence, the drive control of linear motor can be accomplished accurately and rapidly.

According to this invention, it is also possible to carry out an auto-return and a auto-repeat tonearm operation. Specifically, upon the completion of reproduction of recorded music, the tonearm is first elevated and simultaneously the ganged switches $S_1$ and $S_2$ are shifted to stationary terminals c by a well known mechanism. As a result, the electromagnet is energized by an electric current in the reverse direction and the sliding member begins to slidingy move toward the arm rest. In this case, the LED 92 or 96 corresponding to a desired position where the tonearm should be stopped to start the reproduction of the recorded music again or to descend toward the arm rest, is turned on.

It is apparent that modifications are possible without departing from the essential scope of this invention.

For example, concerning optical elements, the invention is not limited to the CdS and the LEDs. Furthermore, a plurality of light receiving elements may be embedded in the base plate of the supporting stand, whereas a light emitting element may be provided to the sliding member. Hence, depending on design criteria, these elements may be reversed.

Furthermore, pairs or multiples of light emitting elements and light receiving elements which face each other may be disposed at positions corresponding to those of the LEDs 9a to 9e shown in FIG. 1, respectively. A shutter member may be provided to the sliding member 6 so that it passes through the cap defined by the respective light emitting elements and light receiving elements. The light emitted by the light emitting element is shielded by the shutter member to show the output voltage variation as shown in FIG. 4.

Moreover, while the linear motor employed in the above described tonearm assembly is of a moving magnet type linear motor, it is apparent that a moving coil type linear motor having a moving coil may also be employed.

What is claimed is:

1. A drive control device for use in a linear motor having a stator and a sliding member capable of sliding along said stator comprising:
   a tone arm assembly coupled to said sliding member;
   means for detecting the position of said sliding member relative to said stator and producing an electrical position signal representative of displacement of said member from a reference position on said stator, said detecting means comprising at least one of a predetermined one of a light emitting element and a light detecting element arranged on said sliding member and at least one of the other one of said light emitting element and light detecting element being provided at at least one stationary reference position, said position signal being produced at an output of said light detecting element;
   signal producing means for producing a reference electrical signal, a magnitude of said reference signal being an average of a maximum level and a minimum level of said position signal over all positions of said sliding member along said stator;
   means for comparing said position signal with said reference signal to produce an output signal; and
   means for controlling driving of said linear motor in response to said output signal to stop sliding movement of said sliding member when said reference signal exceeds said position signal.

2. A drive control device as defined in claim 1, wherein said means for detecting comprises a plurality of light emitting elements arranged at positions each corresponding to said reference position and a light receiving element provided with said sliding member, said light receiving element producing said position signal.

3. A drive control device as defined in claim 1, wherein said means for detecting comprises a plurality of light receiving elements arranged at positions each corresponding to said reference position and a light emitting element provided with said sliding member, said light receiving elements each producing a position signal.

4. A drive control device as defined in claim 1, wherein the linear motor is a moving magnet linear motor.

5. A drive control device as defined in claim 1, wherein the linear motor is a moving coil linear motor.

6. A drive control device as defined in claim 1, wherein a magnetic field strength applied by said stator to said sliding member is determined in accordance with a magnitude of said output signal.

* * * * *